United States Patent [19]

Davidson et al.

[11] Patent Number: 4,733,355

[45] Date of Patent: Mar. 22, 1988

[54] NON-CONTACTING RANGE SENSING AND CONTROL DEVICE

[75] Inventors: Richard W. Davidson, Dublin; John W. Fletcher, Pleasanton, both of Calif.

[73] Assignee: Agtek Development Company, Inc., Livermore, Calif.

[21] Appl. No.: 828,155

[22] Filed: Feb. 10, 1986

[51] Int. Cl.$^4$ ............................................ A01D 75/28
[52] U.S. Cl. .................................. 364/424; 364/561; 56/10.2; 172/4; 172/4.5
[58] Field of Search .................. 364/424, 561, 562; 56/10.2, DIG. 15; 377/16, 17; 73/624, 629, 640; 172/4, 4.5, 26

[56] References Cited

U.S. PATENT DOCUMENTS

| | | | |
|---|---|---|---|
| 4,136,508 | 1/1979 | Coleman et al. | 56/10.2 |
| 4,437,295 | 3/1984 | Rock | 172/4 |
| 4,561,064 | 12/1985 | Brüggen et al. | 364/561 |
| 4,573,124 | 2/1986 | Seiferling | 56/10.2 |
| 4,663,712 | 5/1987 | Kishida | 364/424 |

*Primary Examiner*—Gary Chin
*Attorney, Agent, or Firm*—Limbach, Limbach & Sutton

[57] ABSTRACT

A non-contacting range sensing and control device for controlling the position of a grading implement relative to a datum is disclosed. The device includes a non-contacting distance measuring device that periodically measures the separation distance between the distance measuring device and the datum. Also included is a reference circuit that defines consecutive first, second, and third intervals for comparison to the separation distance, and a comparison circuit that periodically compares the intervals to the separation distance, and generates a positive error signal if the separation distance is within the limits of the first interval, generates no error signal if the separation distance is within the limits of the second interval, and generates a negative error signal if the separation distance is within the limits of the third interval.

14 Claims, 4 Drawing Figures

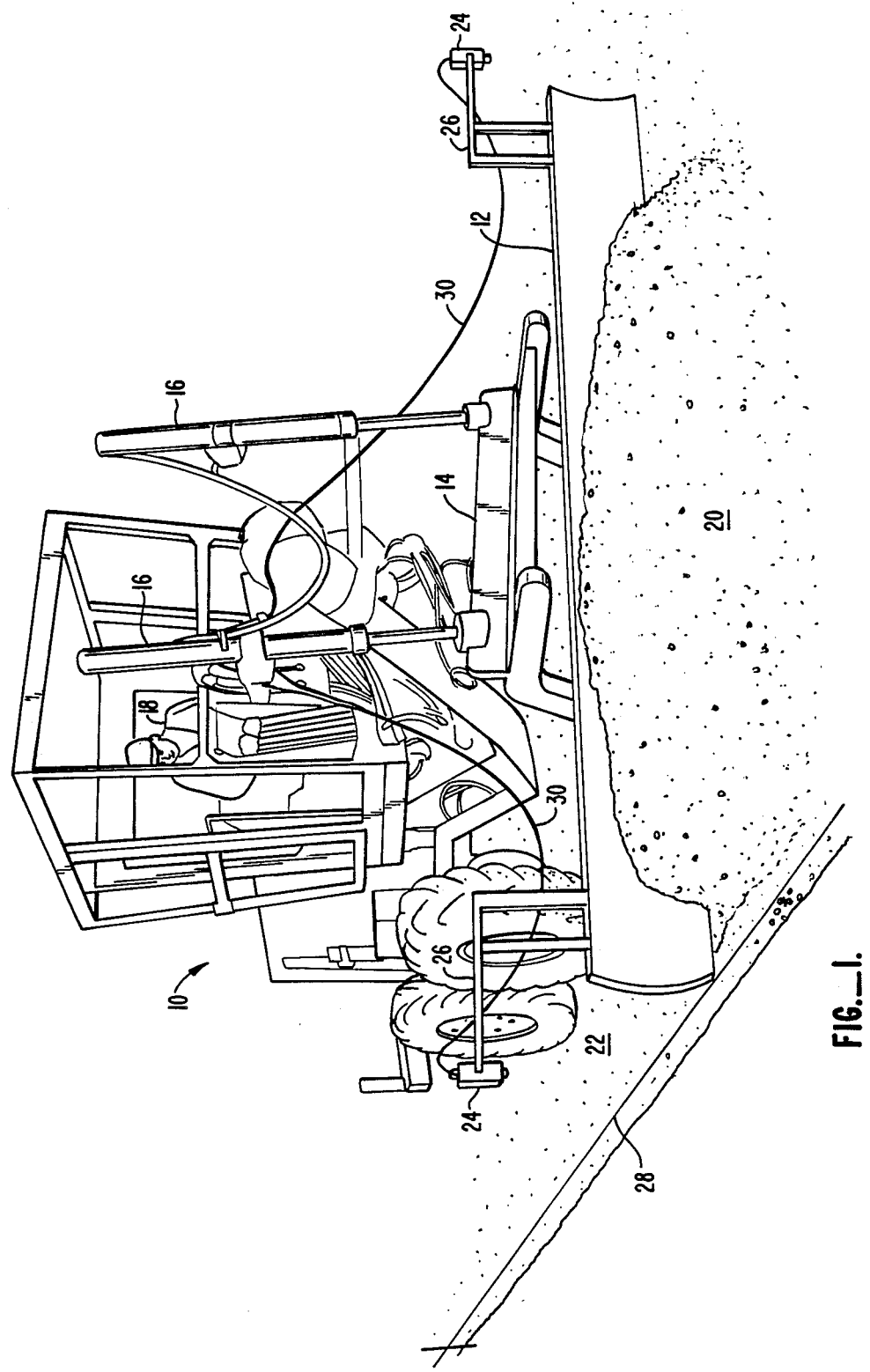
FIG._1.

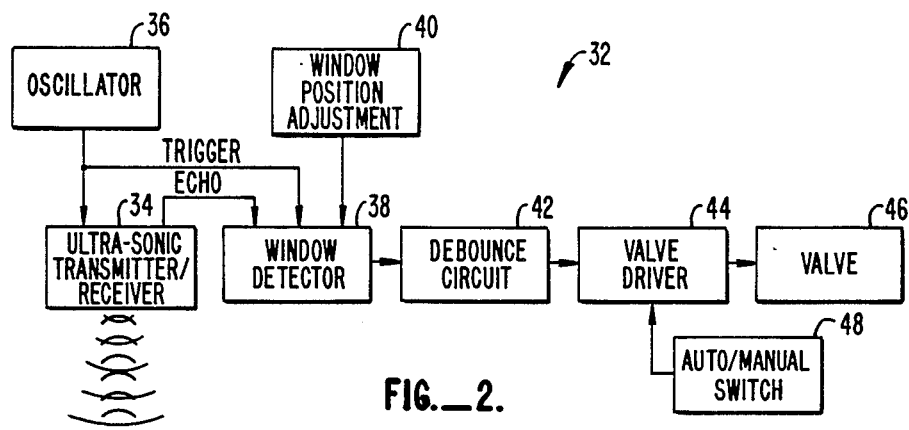
FIG._2.
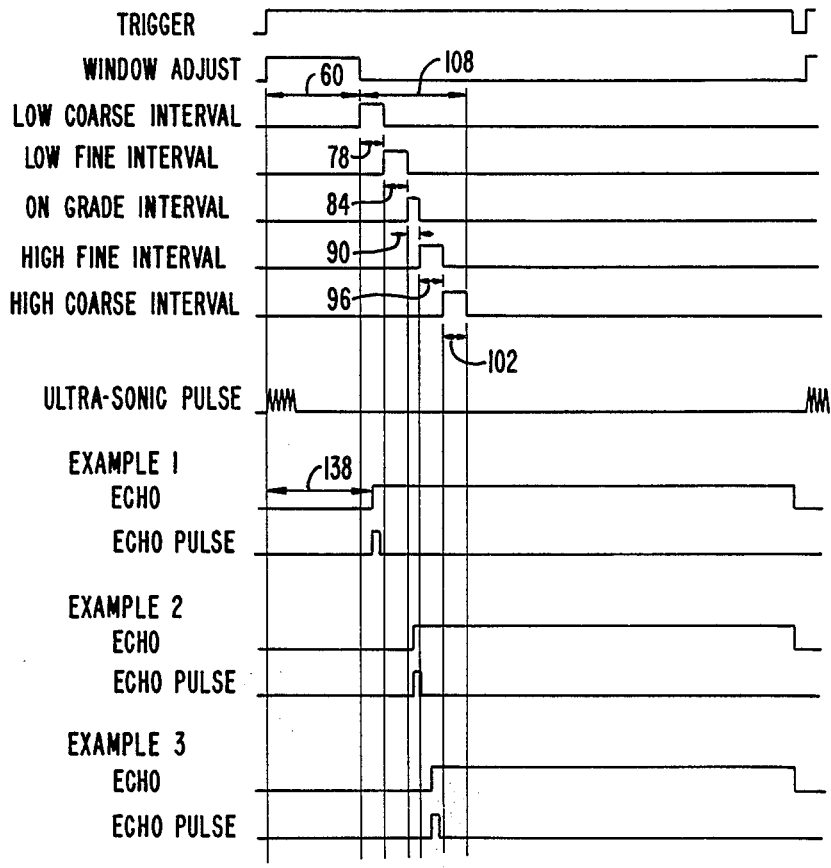
FIG._4.

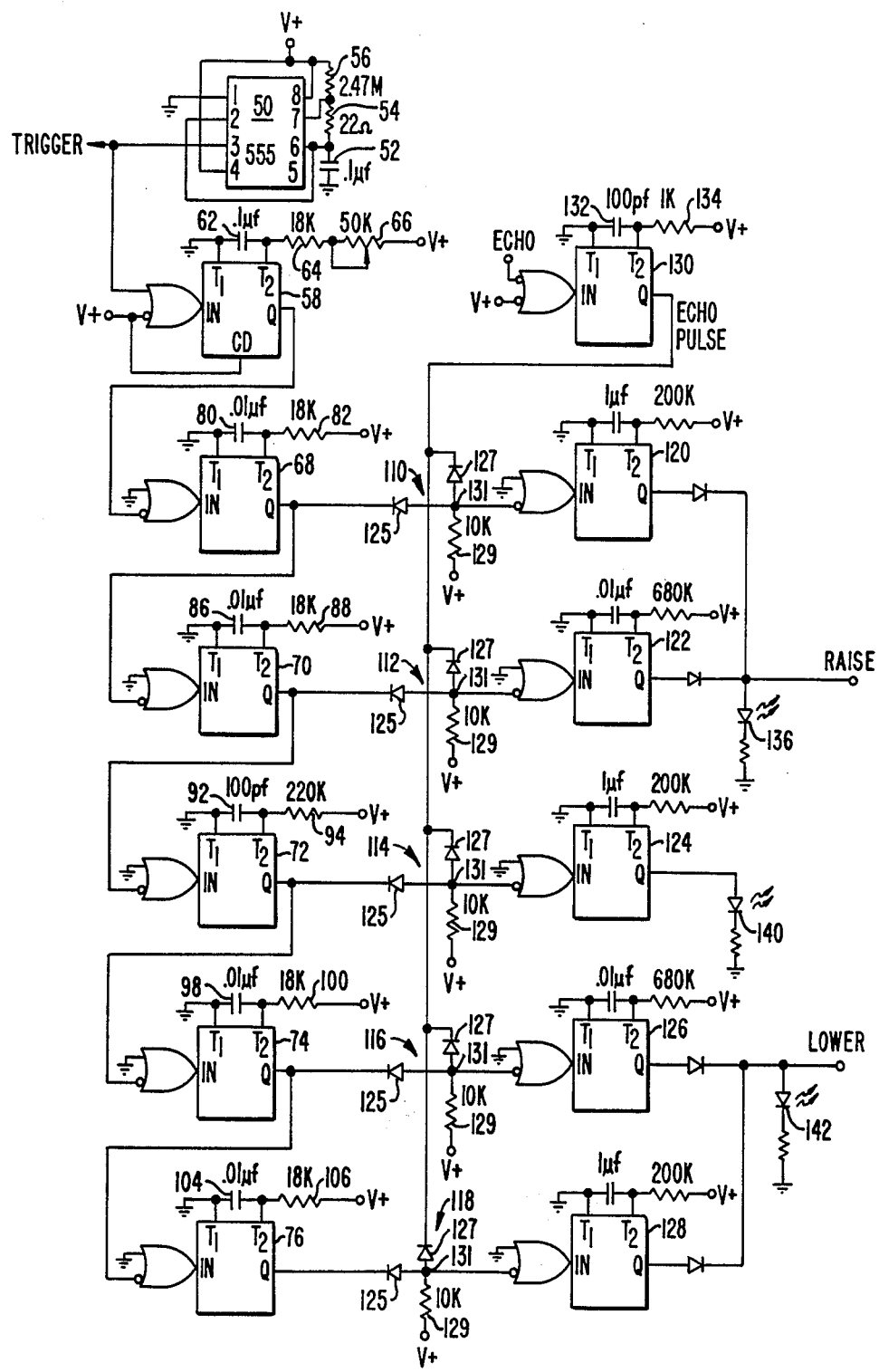
FIG._3.

NON-CONTACTING RANGE SENSING AND CONTROL DEVICE

BACKGROUND OF THE INVENTION

1. Field of the Invention

This invention relates generally to road-construction and earth-moving vehicles, and relates more particularly to a non-contacting range sensing and control device for controlling the position of a grading implement relative to a datum.

2. Description of the Relevant Art

Motor graders, bulldozers, pavers and other road-construction and earth-moving vehicles are often called upon to produce a graded surface that follows a predefined datum. In areas of new construction, for example, the datum might be defined by a string line supported by stakes placed adjacent to the path to be graded. In areas of reconstruction, the datum might be defined by a preexisting curb or pavement surface.

Various devices have been used on earth-moving vehicles to position the grading implements to obtain the desired graded surfaces. The grading implements of these vehicles are usually positioned by hydraulic cylinders that are coupled to mechanisms that support the grading implements. A typical positioning device includes a datum sensing device that is mounted on the grading implement and that senses the position of the datum relative to the implement, and a control device that signals the hydraulic cylinders to reposition the implement accordingly.

One such datum sensing device is a string follower, used where the datum is defined by a string line that is suspended a constant distance above the desired graded surface. A sensor unit is attached to the side of the grading implement nearest the string line, and a pivotable wand extends from the sensor unit and touches the string line. The sensor is responsive to the rotational position of the wand as an indication of the position of the implement relative to the string datum. The wand is often spring loaded against the string line to ensure contact. One drawback to the use of a string follower is that if the spring force is excessive, or if the string line is loosely strung, then the spring force of the wand can displace the string line from its intended position and thereby introduce grading errors. Another drawback is that the operator must stop grading and get out of the cab in order set the wand onto the string line. Another drawback is that if the wand falls off of the string line, then the sensor indicates a large positional error and tries to correct the position of the implement accordingly, thus causing gouges or other discontinuities in the graded surface. Still another drawback is that the wand mechanism typically has limited adjustability, which restricts the location of the string line relative to the desired surface.

Other datum sensing devices include wheels and skids, which are useful where the datum is defined by a pre-existing curb or previously graded surface. A sensor unit is usually mounted to the side or rear of the grading implement, and a projecting arm pivots downward to place the wheel or skid on the datum surface. The sensor unit responds to the rotational position of the arm as a measure of the position of the implement relative to the datum surface. One major drawback to the use of wheels and skids is that they are typically designed for forward movement of the vehicle, so that in order to allow the vehicle to back up, the wheel or skid must be lifted up. If the vehicle backs up without lifting such a wheel or skid, then the mounting mechanism may bend or break off.

SUMMARY OF THE INVENTION

In accordance with the illustrated preferred embodiment, the present invention provides a non-embodiment, contacting range sensing and control device for controlling the position of a grading implement relative to a datum. More specifically, the range sensing and control device determines the positional error of the implement relative to the datum, where the implement is coupled to a vehicle that moves in a direction substantially parallel to the datum. The range sensing and control device includes a non-contacting distance measuring device, a reference circuit, and a comparison circuit. The distance measuring device is coupled for movement with the implement, and periodically measures the separation distance between the distance measuring device and the datum without contacting the datum. The reference circuit defines consecutive first, second, and third comparison intervals for comparison to the measured separation distance, where the first comparison interval defines a positive error region within which the positional error of the implement is directed in one direction, the second comparison interval defines a nominal error region within which the positional error of the implement is acceptably small, and the third comparison interval defines a negative error region within which the positional error of the implement is directed in an opposite direction. The comparison circuit periodically compares the separation distance as measured by the distance measuring device to the comparison intervals as defined by the reference circuit. In addition, the comparison circuit generates a positive error signal if the separation distance is within the limits of the first comparison interval, generates no error signal if the separation distance is within the limits of the second comparison interval, and generates a negative error signal if the separation distance is within the limits of the third comparison interval.

In the preferred embodiment, the measured separation distance and the comparison intervals are defined in terms of time. The distance measuring device is preferably an ultrasonic range finder that can sense string lines as well as surfaces such as curbs and pavement. The ultrasonic rangefinder periodically sends out an ultrasonic pulse and listens for a pulse reflected from the datum. The time period between the transmission of the initial pulse and the receipt of the reflected pulse is proportional to the separation distance between the rangefinder and the datum.

The comparison intervals are also preferably defined in terms of time. The comparison intervals are preferably consecutive time intervals that begin subsequent to a delay time period after the transmission of the ultrasonic pulse. The duration of the delay time period is adjustable, and is chosen so that the reflected pulse will be received during the second comparison time interval when the implement is correctly positioned with respect to the datum. If the reflected pulse is received earlier, during the first comparison time interval, then the separation distance is too small. If the reflected pulse is received later, during the third comparison time interval, then the separation distance is too large. In order to decide whether to issue an error signal, and, if so, to decide the direction or sense of the error, the comparison circuit must first decide within which comparison time interval the reflected pulse is received, and must then issue an appropriate error signal.

The range sensing and control device of the present invention is responsive only to errors within a correctable range, as defined by the duration of the comparison time intervals. If the reflected pulse is received before the start of the first comparison time interval or after the end of the third comparison time interval, then the separation distance is deemed too great to correct and no error signal is generated.

In the preferred embodiment disclosed below, the first and third comparison time intervals are each subdivided into two subintervals. The first subinterval at the beginning of the first comparison time interval and the fourth subinterval at the end of the third comparison time interval define large error regions, while the second subinterval at the end of the first comparison time interval and the third subinterval at the beginning of the second comparison time interval define small error regions. The duration of the error signal generated by the comparison circuit is longer if the reflected pulse is received during a large error subinterval than if it is received during a small error subinterval.

There are many advantageous features of the range sensing and control device of the present invention. First is its ability to follow a wide range of datums, including string lines, curbing, and pregraded surfaces. Second is the ease with which the nominal position of the grading implement can be adjusted by the vehicle operator. Third is that the device does not contact the datum, so that string lines can be followed without distortion. Fourth is that the device does not restrict the maneuverability of the vehicle. Fifth is the absence of mechanisms that could otherwise jam. Sixth is the insensitivity to losing track of a string line, since no error signals are generated if the sensed datum position is not within the correctable range. Seventh is the ease with which the operator can engage and disengage the device.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter. In particular, the term earth-moving vehicle is intended to include motor graders, bulldozers, pavers, and other such vehicles that carry grading implements. The term grading implement is intended to include blades, scrapers, and other implements required to be positioned relative to a datum. The term sonic includes frequencies in the ultrasonic range as well as frequencies within the range of human hearing. The terms positive and negative are relative directional terms, and do not necessarily refer to a particular direction.

BRIEF DESCRIPTION OF THE DRAWINGS

FIG. 1 is a perspective view of a portion of a motor grader following a string line datum and having two range sensing and control devices installed thereon.

FIG. 2 is a block diagram of a range sensing and control device according to the present invention.

FIG. 3 is a schematic diagram of a portion of the range sensing and control device of FIG. 2.

FIG. 4 is a timing diagram of a portion of the range sensing and control device of FIG. 2.

DETAILED DESCRIPTION OF THE PREFERRED EMBODIMENT

FIGS. 1 through 4 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The preferred embodiment of the present invention is a non-contacting range sensing and control device for controlling the position of a grading implement relative to a datum. While the present invention is directed to a range sensing and control device that is useful in many applications, the range sensing and control device is particularly suited for controlling the vertical position of a blade of a motor grader. Accordingly, the present invention will be described for purposes of full disclosure as well as purposes of illustration as practiced with a motor grader.

A motor grader 10 is illustrated in FIG. 1 with the front portion of the motor grader removed for clarity. Slung underneath the motor grader 10 is a blade 12, which is mounted on a platform 14 that is pivotably attached to the front of the motor grader (not shown). The vertical position of the platform 14 and the blade 12 is adjusted by two hydraulic cylinders 16. In operation of the motor grader 10 without the assistance of the range sensing and control device of the present invention, the operator 18 manually adjusts the vertical position of the blade 12 through hydraulic controls coupled to the cylinders 16. The slope of the blade 12 with respect to horizontal can be varied by independent movement of the cylinders 16. Additional hydraulic systems (not shown) are operable for rotating the blade 12 around a vertical axis, varying the angle of attack of the blade, and moving the blade laterally. Forward motion of the motor grader 10 evenly spreads a pile of dirt or gravel 20 into a graded surface 22.

Two sensor units 24 of the present invention are shown mounted on frames 26 to both sides of the blade 12. Both sensor units 24 overhang the outer edges of the blade 12 and are positioned above a datum, such as a string line 28, that is located just outside of the width of the blade and that extends along the direction of travel of the motor grader 10. Each sensor unit is connected via an electrical cable 30 to a control box (not shown) located near the operator 18 in the operator's cab. Either of the two sensor units 24 can be used to sense a datum 28 for controlling the vertical position of the blade 12. Alternatively, the sensor units 24 could sense two separate datums, one on each side of the motor grader 10, for controlling both the vertical position and the slope of the blade 12.

The circuitry of the range sensing and control device of the present invention is divided between the sensor unit 24 suspended over the datum and the control box located in the cab. In reference to FIG. 2, one component of the range sensing and control device 32 that is contained in the sensor unit 24 is an ultrasonic transmitter/receiver or rangefinder 34. An oscillator 36 periodically supplies a trigger signal to the rangefinder 34, which in response transmits an ultrasonic signal downward toward the datum 28. A portion of that ultrasonic signal is reflected back from the datum 28 to the rangefinder 34, which the rangefinder responds to by generating an echo signal. The rangefinder 34 responds only to the first received reflected signal; subsequently received signals, such as might be reflected by the ground under a string line, are ignored.

The time period between the generation of the trigger signal and the generation of the echo signal is a measure of the separation distance between the rangefinder 34 and the datum 28. Since the rangefinder 34 is fixedly attached to and moveable with the blade 12, the rangefinder provides means for measuring the position of the blade 12 relative to the datum 28. Of course, the datum need not be a string line because the rangefinder will sense a broad range of surfaces such as curbs, pavement, and previously graded surfaces. Preferably, the rangefinder 34 includes an SN28827 ranging module manufactured by Texas Instruments, and a #8667 electrostatic transducer manufactured by Polaroid.

The trigger signal generated by the oscillator 36 and the echo signal generated by the rangefinder 34 are supplied to a window detector circuit 38. The window detector circuit 38 includes two functional elements, a timing circuit and a comparison circuit. The timing circuit defines a measurement window that begins after a time delay, as specified by a window position adjustment circuit 40, subsequent to the receipt by the timing circuit of the trigger signal. The measurement window consists of three consecutive time intervals, the first of which defines a positive error region, the second of which defines a nominal error region, and the third of which defines a negative error region.

The comparison circuit determines within which interval of the measurement window that the echo signal arrives, and issues an appropriate error signal. If the echo signal arrives during the second timing interval, the blade is at or near its desired position, and no error signal is issued. If the echo signal arrives during the first timing interval, which means that the separation distance between the sensor unit 24 and the datum 28 is less than desired, then the blade is too low and an error signal of one sense is generated. If the echo signal arrives during the third timing interval, which means that the separation distance between the sensor unit 24 and the datum 28 is greater than desired, then the blade is too high and an error signal of an opposite sense is generated.

The error signals generated by the comparison circuit are routed through a debounce circuit 42, which acts as a filter to prevent false triggering, to a valve driver 44. The valve driver 44 controls a hydraulic valve 46 that supplies hydraulic pressure to one side or the other of the hydraulic cylinders 16, depending upon whether the blade is to raised or lowered. A switch 48, connected to the valve driver 44 and preferably located in the control box near the operator, allows the range sensing and control device 32 to be disconnected and the blade control to be accomplished manually.

The details of the circuitry of the oscillator 36, the window position adjustment circuit 40, and the window detector 38 will now be described with the aid of FIGS. 3 and 4. The oscillator 36 is preferably a model 555 monolithic timing circuit 50, with the ground pin (1) connected to ground, and the power pin (8) and the reset pin (4) connected to a source of positive voltage, V+. The timer 50 is wired for astable operation, with a capacitor 52 coupled between the commonly connected trigger and threshold pins (2 and 6) and ground, a resistor 54 coupled between the threshold pin (6) and the discharge pin (7), and a resistor 56 coupled between the discharge pin (7) and V+. The output pin (3) supplies the trigger signal to the rangefinder 34 and to the window detector 38.

As so wired, the timer 50 retriggers itself, and causes the voltage on the capacitor 52 to oscillate between one third of V+ and two thirds of V+. The capacitor 52 charges through resistors 54 and 56 to two thirds of V+, and discharges through resistor 54 to one third of V+. Since the value of resistor 56 is much larger than that of resistor 54, the resulting waveform of the trigger signal is an inverted pulse, as shown in FIG. 4. Preferably, the frequency of the trigger signal is about five cycles per second. As applied to the rangefinder 34, the trigger signal serves as both a trigger signal, which initiates the generation of the ultrasonic pulse, and an enable signal, which enables the rangefinder circuitry to generate the echo signal in response to the received ultrasonic pulse reflected from the datum 28.

Within the window detector circuit 38 is the timing and comparison circuitry. The trigger signal from the timer 50 is applied to the rising edge trigger input pin of a delay monostable multivibrator 58, which generates the window adjust signal. The window adjust signal (FIG. 4) is initially logic low, is set logic high by the rising edge of the trigger signal, and is reset low after a delay time period 60. The duration of the delay time period 60 is determined by the RC product of a capacitor 62 connected between timing pins T1 and T2, and series resistors 64 and 66 connected between pin T2 and V+. Resistor 66, which comprises the window position adjustment circuit 40, is adjustable so that the duration of the delay time period 60 can be adjusted to vary the nominal position of the blade 12 relative to the datum 28.

The window adjust signal generated by the delay multivibrator 58 is supplied to a series of five timing monostable multivibrators 68, 70, 72, 74, and 76. The timing multivibrators are cascaded together, with the output of each timing multivibrator coupled to the input of the next timing multivibrator in line. The five timing multivibrators define the comparison time intervals that comprise the measurement window. Timing multivibrator 68 receives the window adjust signal from the delay multivibrator 58 at its falling edge trigger input pin, and generates a low coarse interval signal (FIG. 4). The high pulse 78 of the low coarse interval signal begins at the falling edge of the window adjust signal, that is, after the delay time period fixed by the delay multivibrator 58. The duration of the high pulse 78 of the low coarse interval signal is determined by the values of capacitor 80 and resistor 82, which are connected to the timing pins T1 and T2 of the timing multivibrator 68.

Timing multivibrator 70 receives the low coarse interval signal from the timing multivibrator 68 at its falling edge trigger input pin, and generates a low fine interval signal (FIG. 4). The high pulse 84 of the low fine interval signal begins at the falling edge of the low coarse interval signal. The duration of the high pulse 84 of the low fine interval signal is determined by the values of capacitor 86 and resistor 88, which are connected to the timing pins T1 and T2 of the timing multivibrator 70.

Timing multivibrator 72 receives the low fine interval signal from the timing multivibrator 70 at its falling edge trigger input pin, and generates an on grade interval signal (FIG. 4). The high pulse 90 of the on grade interval signal begins at the falling edge of the low fine interval signal. The duration of the high pulse 90 of the on grade interval signal is determined by the values of capacitor 92 and resistor 94, which are connected to the timing pins T1 and T2 of the timing multivibrator 72.

Timing multivibrator 74 receives the on grade interval signal from the timing multivibrator 72 at its falling edge trigger input pin, and generates a high fine interval signal (FIG. 4). The high pulse 96 of the high fine interval signal begins at the falling edge of the on grade interval signal. The duration of the high pulse 96 of the high fine interval signal is determined by the values of capacitor 98 and resistor 100, which are connected to the timing pins T1 and T2 of the timing multivibrator 74.

Timing multivibrator 76 receives the high fine interval signal from the timing multivibrator 74 at its falling edge trigger input pin, and generates a high coarse interval signal (FIG. 4). The high pulse 102 of the high coarse interval signal begins at the falling edge of the high fine interval signal. The duration of the high pulse 102 of the high coarse interval signal is determined by the values of capacitor 104 and resistor 106, which are connected to the timing pins T1 and T2 of the timing multivibrator 76.

Together, the five consecutive interval pulses 78, 84, 90, 96, and 102 define the duration of the measurement time period or window 108. Using terms introduced above in the Summary of the Invention, the high pulses of the low coarse interval signal and the low fine interval signal together define the first comparison time interval, with the high pulse of the low coarse interval signal defining the first subinterval and the high pulse of the low fine interval signal defining the second subinterval. The high pulse of the on grade interval signal defines the second comparison time interval. Also, the high pulses of the high fine interval signal and the high coarse interval signal together define the third comparison time interval, with the high pulse of the high fine interval signal defining the third subinterval and the high pulse of the high coarse interval signal defining the fourth subinterval.

The monostable multivibrators are preferably model 4538's, and the positive voltage V+ is preferably about six volts. With the components of the timing circuit having the values as specified in FIG. 3, the approximate durations of the intervals are:

|  | duration in milliseconds | length in inches |
| --- | --- | --- |
| low coarse interval | 0.18 | 1.2 |
| low fine interval | 0.18 | 1.2 |
| on grade interval | 0.022 | 0.30 |
| high fine interval | 0.18 | 1.2 |
| high coarse interval | 0.18 | 1.2 |

Thus, the total measurement window is about 0.74 milliseconds or 5.1 inches in width, with the positive error region comprising about 0.36 milliseconds and 2.4 inches, the nominal error region comprising about 0.022 milliseconds and 0.30 inches, and the negative error region comprising about 0.36 milliseconds and 2.4 inches.

Having thus described the timing circuit portion of the window detector 38, the comparison circuit portion will now be described. The output pins of each of the timing multivibrators 68, 70, 72, 74, and 76 are coupled through diode AND gates 110, 112, 114, 116, and 118, respectively, to the falling edge trigger input pins of signaling monostable multivibrators 120, 122, 124, 126, and 128. Each AND gate consists of two diodes 125 and 127, and a resistor 129. The anodes of the diodes 125 and 127 are connected to an output node 131, which is connected through resistor 129 to V+. The cathodes of the diodes 125 and 127 serve as the input terminals of the AND gate. One input terminal of each AND gate is connected to the output terminal of a timing multivibrator 68, 70, 72, 74, or 76. The other input terminal is coupled to receive an echo pulse signal generated by a monostable multivibrator 130.

The multivibrator 130 receives the echo signal from the rangefinder 34 at its rising edge trigger input pin. The duration of the positive pulse of the echo pulse signal is preferably much shorter than the duration of the timing intervals pulses 78, 84, 90, 96, and 102, and is determined by the values of capacitor 132 and resistor 134, which are connected to the timing pins T1 and T2 of the multivibrator 130.

The AND gates 110, 112, 114, 116, and 118 logically AND the echo pulse signal with each of the five timing interval signals. If both the echo pulse signal and one of the timing interval signals are simultaneously positive, then the corresponding signaling multivibrator will be triggered. Once triggered, the signaling multivibrator issues a pulsed output, the duration of which is determined by a capacitor and resistor connected to its timing pins.

Signaling multivibrators 120 and 122, which correspond to the low coarse and low fine intervals, generate error signals that are supplied to the valve driver 44. The error signals reflect a positional error of the blade 12 in one direction, namely that the blade is too low. In response to either of the two error signals, the valve driver 44 causes the blade 12 to be raised by opening the valve 46 to the appropriate side of the hydraulic cylinders 16 for the duration of the error signal pulse. If the error signal is generated by the low coarse multivibrator 120, which indicates a relatively large positional error, the duration of the positive pulse is longer than if the error signal is generated by the low fine multivibrator 122, which indicates a relatively small positional error. The error signal also causes a light emitting diode 136 to light for the duration of the pulse.

As a first example, assume that the separation distance between the rangefinder 34 and the datum 28 is indicated by the time period 138 (FIG. 4) between the rising edge of the trigger signal and the rising edge of the echo signal. Since the echo pulse and the low coarse interval signals are simultaneously positive, AND gate 110 triggers the low coarse signaling multivibrator 120, which issues a long duration error signal to the valve driver to raise the blade 12. The LED 136 lights up to show the operator 18 that a low reading was obtained and that the blade 12 is being repositioned upward.

In a second example, assume that the echo pulse occurs during the second timing interval, wherein the echo pulse and the on grade interval signals are simultaneously positive (see FIG. 4). The AND gate 114 triggers the on grade signaling multivibrator 124, which generates an output signal that lights a light emitting diode 140 that indicates an on grade reading. Since no correction of the blade 12 is required in this case, no error signal is supplied to the valve driver 44.

Signaling multivibrators 126 and 128, which correspond to the high fine and high coarse intervals, generate error signals that are supplied to the valve driver 44.

The error signals reflect a positional error of the blade 12 in an opposite direction, namely that the blade is too high. In response to either of the two error signals, the valve driver 44 causes the blade 12 to be lowered by opening the valve 46 to the appropriate side of the hydraulic cylinders 16 for the duration of the error signal pulse. If the error signal is generated by the high coarse multivibrator 128, which indicates a relatively large positional error, the duration of the positive pulse is longer than if the error signal is generated by the high fine multivibrator 126, which indicates a relatively small positional error. The error signal also causes a light emitting diode 142 to light for the duration of the pulse.

As a third example, as shown in FIG. 4, assume that the echo pulse and the high fine interval signals are simultaneously positive. The AND gate 116 triggers the high fine signaling multivibrator 126 to issue a short duration error signal to the valve driver 44 to lower the blade 12. The LED 142 lights up to show the operator 18 that a high reading was obtained and that the blade 12 is being repositioned downward.

With the components of the comparison circuit having the values as specified in FIG. 3, the approximate duration of the error correction signals is:

|  | duration, milliseconds |
|---|---|
| Raise |  |
| large error | 200 |
| small error | 68 |
| Lower |  |
| large error | 200 |
| small error | 68 |

Preferably, the LED's 136, 140, and 142 are located in the control box near the operator 18. Also located in the control box are the auto/manual switch 48, and the window position adjustment resistor 66.

From the above description, it will be apparent that the invention disclosed herein provides a non-contacting range sensing and control device for controlling the position of a grading implement relative to a datum. The foregoing discussion discloses and describes merely exemplary methods and embodiments of the present invention. As will be understood by those familiar with the art, the invention may be embodied in other specific forms without departing from the spirit or essential characteristics thereof.

For example, a sensor unit 24 could be positioned to measure the lateral distance between the blade 12 and the vertical side of a curb, with any resulting error signal being used to laterally reposition the blade. Or, the ultrasonic rangefinder, which defines the separation distance in terms of a time period, could be replaced by an optical rangefinder, which would define the separation distance as a numerical value that could be compared to numerically defined comparison intervals to generate the appropriate error signals.

Accordingly, the disclosure of the present invention is intended to be illustrative, but not limiting, of the scope of the invention, which is set forth in the following claims.

What is claimed is:

1. An apparatus for controlling the position of a grading implement of an earth-moving vehicle relative to a datum that extends along the direction of travel of the vehicle and that is elevated above ground level, said apparatus comprising:

position adjustment means coupled to the implement for moving the implement in one direction relative to the datum in response to a positive error signal and for moving the implement in an opposite direction relative to the datum in response to a negative error signal;

sonic means coupled for movement with the implement for periodically transmitting a sonic signal downward toward the datum and for receiving a sonic signal reflected upward from the datum, wherein the time period between the transmission and receipt of said sonic signal defines a measurement time period that is proportional to the separation distance between said sonic means and the datum;

timing means for periodically defining consecutive first, second, and third comparison time intervals of finite duration, wherein said first comparison time interval defines a positive error region beginning at a time after the transmission of the sonic signal by said sonic means, said second comparison time interval defines a nominal error region beginning at the end of said first comparison time interval, and said third comparison time interval defines a negative error region beginning at the end of said second comparison time interval; and comparison means for periodically comparing said measurement time period to said comparison time intervals, for generating said positive error signal if said measurement time period ends during said first coparison time interval, for generating said negative error signal if said measurement time period ends during said third comparison time interval, for generating no error signals if said measurement time period ends during said second comparison time interval, for generating no error signals if said measurement time period ends before said first comparison time interval begins, and for generating no error signals if said measurement time period ends after said third comparison time interval ends.

2. An apparatus as recited in claim 1 wherein said sonic means includes means for transmitting the sonic signal toward the datum in response to a first time reference signal, and includes means for generating a second time reference signal upon the receipt of the reflected sonic signal, wherein said first and second time reference signals respectively define the beginning and end of said measurement time period.

3. An apparatus as recited in claim 2 wherein said first comparison time interval begins a delay time period after the receipt of said first time reference signal, and wherein said delay time period is selected so that, when the grading implement is positioned at its nominal position relative to the datum, said measurement time period is substantially equal to the sum of said delay time period plus said first comparison time interval plus one half of said second comparison time interval.

4. An apparatus as recited in claim 3 wherein said apparatus further includes means for periodically generating said first time reference signal to periodically initiate a correction of the position of the grading implement.

5. An apparatus as recited in claim 2 wherein said first comparison time interval is defined by an output signal of a first monostable multivibrator triggered by said first time reference signal, wherein said second comparison time interval is defined by an output signal of a second monostable multivibrator triggered by the end of said first comparison time interval, and wherein said third comparison time interval is defined by an output signal of a third monostable multivibrator triggered by the end of said second comparison time interval.

6. An apparatus as recited in claim 5 wherein the durations of said first, and second, and third comparison time intervals are respectively determined by timing components coupled to said first, second, and third monostable multivibrators.

7. An apparatus as recited in claim 5 wherein said comparison means includes first and second gate means, wherein said first gate means receives said second time reference signal and the output signal of said first monostable multivibrator and generates said positive error signal when both inputs thereto are simultaneously present, and wherein said second gate means receives said second time reference signal and the output signal of said third monostable multivibrator and generates said negative error signal when both inputs thereto are simultaneously present.

8. An apparatus as recited in claim 1 wherein said first gate means includes a first AND gate that receives said second time reference signal and the output signal of said first monostable multivibrator, and a fourth monostable multivibrator that receives the output signal of said first AND gate and generates said positive error signal having a duration defined by timing components coupled to said fourth monostable multivibrator.

9. An apparatus as recited in claim 7 wherein said second gate means includes a second AND gate that receives said second time reference signal and the output signal of said third monostable multivibrator, and a fifth monostable multivibrator that receives the output signal of said second AND gate and generates said negative error signal having a duration defined by timing components coupled to said fifth monostable multivibrator.

10. An apparatus as recited in claim 1 wherein said first comparison time interval includes a first subinterval and a second subinterval with said second subinterval extending between the end of said first subinterval and the beginning of said second comparison time interval, said first subinterval defining a large positive error region and said second subinterval defining a small positive error region, and wherein said comparison means is further operable for generating said positive error signal for a longer duration when said measurement time period ends during said first subinterval than when said measurement time period ends during said second subinterval.

11. An apparatus as recited in claim 1 wherein said third comparison time interval includes a first subinterval and a second subinterval with said first subinterval extending between the end of said second comparison time interval and the beginning of said second subinterval, said first subinterval defining a small negative error region and said second subinterval defining a large negative error region, and wherein said comparison means is further operable for generating said negative error signal for a longer duration when said measurement time period ends during said second subinterval than when said measurement time period ends during said first subinterval.

12. An apparatus for determining the positional error of a grading implement of an earth-moving machine with respect to a datum, said apparatus comprising:

means for periodically generating a trigger signal;

ultrasonic means coupled for movement with the implement for transmitting an ultrasonic signal toward the datum in response to said trigger signal and for generating an echo signal upon receipt of an ultrasonic signal reflected from the datum;

timing means for defining a delay time period upon receipt of said trigger signal and for defining consecutive first, second, and third comparison time intervals immediately after said delay time period, wherein said first comparison time interval defines a positive error region, said second comparison time interval defines a nominal error region within which the positional error of the implement is acceptably small, said third comparison time interval defines a negative error region, and wherein said delay time period is selected so that the time period between the generation of said trigger signal and the generation of said echo signal is substantially equal to the sum of said delay time period plus said first comparison time interval plus one half of said second comparison time interval when the grading implement is positioned at its nominal position relative to the datum; and comparison means for comparing said echo signal to said comparison time intervals, for generating a positive error signal if said echo signal is received during said first comparison time interval, for generating a negative error signal if said echo signal is received during said third comparison time interval, and for generating no error signals if said echo signal is received before said first comparison time interval begins, if received during said second comparison time interval, and if received after said third comparison time interval ends.

13. An apparatus as reoited in claim 12 Wherein said first comparison time interval consists of a first subinterval that defines a large positive error region and a second subinterval that defines a small positive error region, wherein said third comparison time interval consists of a third subinterval that defines a small negative error region and a fourth subintnerval that defines a large negative erorr region, wherein said first subinterval, said second subinterval, said second comparison time interval, said third subinterval, and said fourth subinterval occur in succession, wherein said positive error signal has a shorter duration if said echo signal is received during said second subinterval than if said echo signal is recieved during said first subinterval, and wherein said negative error signal has a shorter duration if said echo signal is received during said third subinterval than if said echo signal is received during said fourth subinterval.

14. An apparatus for controlling the vertical position of a grading implement of an earth-moving vehicle relative to a datum that extends alog the direction of travel of the vehicle, wherein said vehicle includes means coupled to the implement for moving the implement upward in response to a low error signal and for moving the implement downward in response to a high error signal, said apparatus comprising:

sonic means, coupled for movement with the implement and positioned above the datum, for periodically transmitting a sonic signal downward toward the datum and for receiving a sonic signal reflected upward from the datum, wherein the time period between the transmission and receipt of said sonic signal defines a measurement time period that is proportional to the separation distance between said sonic means and the datum;

timing means for periodically defining consecutive first, second, and third comparison time intervals of finite duration, wherein said first comparison time interval defines a low error region beginning at a time after the transmission of the sonic signal by said sonic means, said second comparison time interval defines a nominal error region beginning at the end of said first comparison time interval, and said third comparison time interval defines a high error region beginning at the end of said second comparison time interval; and comparison means for periodically comparing said measurement time period to said comparison time intervals, for generating said low error signal if said measurement time period ends during said first comparison time interval, for generating said high error signal is said measurement time period ends during said third comparison time interval, for generating no error signals if said measurement time period ends during said second comparison time interval, for generating no error signals if said measurement time period ends before said first comparison time interval begins, and for generating no error signals if said measurement time period ends after said third comparison time interval ends.

* * * * *